United States Patent [19]

Kim

[11] Patent Number: 5,459,788
[45] Date of Patent: Oct. 17, 1995

[54] APPARATUS FOR INTERFACING ANALOG TELEPHONE IN ISDN TERMINAL ADAPTER

[75] Inventor: Ho-jun Kim, Seoul, Rep. of Korea

[73] Assignee: Samsung Electronics Co., Ltd., Kyunggi, Rep. of Korea

[21] Appl. No.: 340,440

[22] Filed: Nov. 14, 1994

Related U.S. Application Data

[63] Continuation of Ser. No. 811,119, Dec. 20, 1991, abandoned.

[30] Foreign Application Priority Data

Dec. 26, 1990 [KR] Rep. of Korea ............ 90-22114

[51] Int. Cl.$^6$ .................................. H04J 3/12
[52] U.S. Cl. ................. 379/399; 379/413; 379/283; 379/93; 379/94; 370/68.1
[58] Field of Search ................ 379/399, 413, 379/93, 94, 283; 370/68.1

[56] References Cited

U.S. PATENT DOCUMENTS

| | | | |
|---|---|---|---|
| 4,460,806 | 7/1984 | Canniff et al. | 379/283 |
| 4,805,172 | 2/1989 | Barbe et al. | 370/68.1 |

*Primary Examiner*—Jeffery A. Hofsass
*Assistant Examiner*—Jacques M. Saint-Surin
*Attorney, Agent, or Firm*—Leydig, Voit & Mayer

[57] ABSTRACT

An apparatus for interfacing an analog telephone in an ISDN terminal adapter is able to independently perform call set-up regardless of a personal computer's operation, while being provided with ISDN audio service via an existing analog telephone. The apparatus includes a combocodec for converting a digital audio signal from the co-processor into an analog audio signal to supply it to a telephone, and for digitizing an analog audio signal from the telephone to supply it to the co-processor; a ring generator for generating a ring signal under the control of the co-processor; and a DC-voltage converter for generating a telephone driving voltage. A subscriber line interfacing circuit (SLIC) is connected to a telephone, a DC-voltage converter, and a combocodec, for supplying the telephone driving voltage to the telephone, interfacing the audio signals between the telephone and combocodec, and sensing the office line to determine the telephone's hook state. A relay is connected among the SLIC, ring generator, and the telephone, for supplying the ring signal from the ring generator to the telephone under the control of the SLIC. A tone decoder is provided for decoding a dual tone multi-frequency signal from among the audio signals from the SLIC to the combocodec, and transmitting the decoded signal to the co-processor.

4 Claims, 2 Drawing Sheets

5,459,788

APPARATUS FOR INTERFACING ANALOG TELEPHONE IN ISDN TERMINAL ADAPTER

This application is a continuation of application Ser. No. 07/811,119, filed Dec. 20, 1991, now abandoned.

BACKGROUND OF THE INVENTION

The present invention relates to an apparatus for interfacing an analog telephone of an integrated services digital network (ISDN) terminal adapter, and particularly to an apparatus for interfacing an analog telephone capable of performing call set-up through an existing analog telephone, independent of the operation of a personal computer.

Generally, an ISDN terminal adapter is installed in expansion slots mounted on a personal computer to use the personal computer as an ISDN terminal, thereby serving as a communication device which intermediates a digital information transfer. The ISDN terminal adapter is connected to network termination equipment via S-interface which has a 2B+D basic access. Here, 2B+D means an ISDN access channel composed of two B-channels and one D-channel. The B-channel is a 64 kbps synchronizing channel for transferring various user information and providing access to the following: a line exchange switching element, a packet exchange switching element for connecting a packet-type terminal, a semipermanent connection-line, and the like. In the ISDN, the D-channel is a 16 kbps channel for transmitting line signal processing information for line exchange switching in an ISDN in accordance with the form of interface, The adapter is operated in a built-in processor by a routine of a protocol processing program, and then performs call set-up and data transmission, etc., which are desirous to ISDN service application programs of a personal computer. Since only a handset, a headset, or a special telephone such as a digital telephone should be utilized to provide audio service besides a digital telephone, existing telephones are not compatible with the ISDN terminal adapters. Because call set-up must be carried out in the personal computer when a handset is the sole provision of the audio service, there is a disadvantage in that operation of the personal computer must be interrupted. Instead of carrying out the call set-up independent of the personal computer when the special telephone is utilized, it is more expensive.

SUMMARY OF THE INVENTION

It is an object of the present invention to provide an apparatus for interfacing an analog telephone in an ISDN terminal adapter capable of independently performing call set-up regardless the ongoing operation of a personal computer, while being supplied with an ISDN audio service through an existing analog telephone.

To achieve these and other objects, there is provided an apparatus for interfacing an analog telephone in an ISDN terminal adapter provided with a co-processor for controlling and processing of the communication with network termination equipment, which comprises: a combocodec for converting digital audio signal generated from the co-processor into analog audio signal to supply the converted analog audio signal to a telephone, and converting an analog audio signal from the telephone into a digital audio signal to supply the digitized audio signal to the co-processor; a ring generator for generating a ring signal in response to a ring generating control signal through a control bus of the co-processor; a DC-voltage converter for receiving power from a computer power supply, and performing a DC-voltage conversion to supply a voltage required for a TIP/RING loop operation; a subscriber line interfacing circuit inter-connected to the telephone, DC-voltage converter, and combocodec, for supplying a telephone driving voltage generated from the DC-voltage converter to the telephone, intermediating a bilateral audio signal transfer between the telephone and combocodec, and monitoring current or voltage on the TIP/RING loop to distinguish a telephone hook status; a relay inter-connected to the subscriber line interfacing circuit, ring generator, and telephone, for transmitting the ring signal generated from the ring generator to the telephone through the subscriber line interfacing circuit; and a tone decoder for decoding a dual tone multi-frequency signal among the audio signals transmitted from the subscriber line interfacing circuit to the combocodec, and transmitting the decoded signal to the co-processor.

BRIEF DESCRIPTION OF THE DRAWINGS

Other objects and advantages of the present invention will become more apparent by the following description with reference to accompanying drawings, in which.

DETAILED DESCRIPTION OF THE INVENTION

Figure 1:
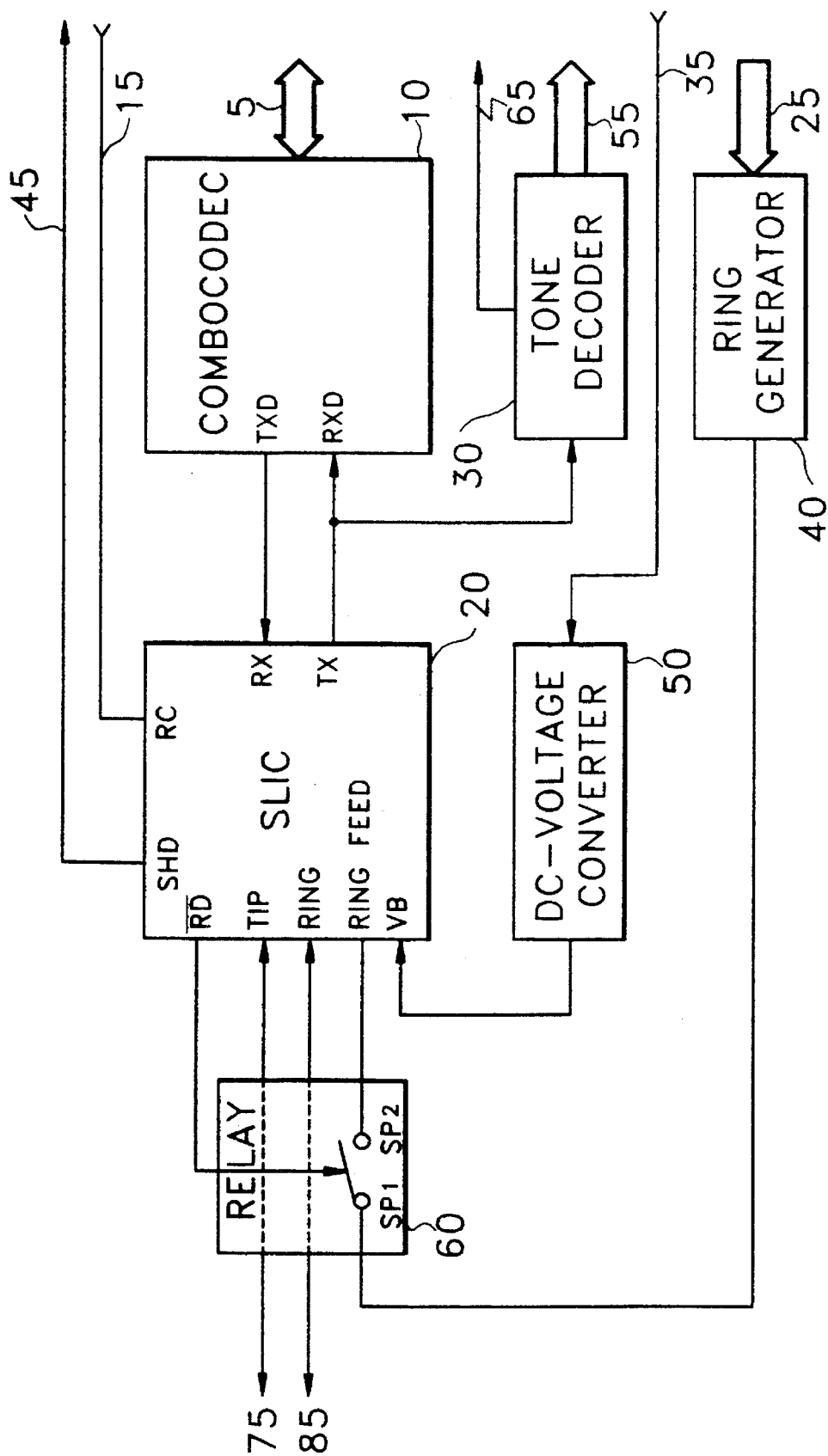
FIG. 1 is a block diagram of an embodiment of an apparatus for interfacing an analog telephone in an ISDN terminal adapter according to the present invention; and FIG, 2 is a detailed circuit diagram of the apparatus of FIG. 1.

In FIG. 1, a first I/O line 5 is electrically connected to the data bus of a co-processor (not shown) to supply a digital audio signal to the co-processor and receive a digital audio signal from the co-processor. A second input line 15 is connected to the control bus of the co-processor to receive a ring supply control signal from the co-processor, A third input line 25 is connected to the control bus of the co-processor to receive a ring generating control signal from the co-processor. A fourth input line 35 is connected to the power source of a personal computer for receiving the power supply voltage of the personal computer. A second output line 45 is connected to the control bus of the co-processor for supplying a hook signal to the co-processor. A third output line 55 is connected to the control bus of the co-processor to transmit tone data to the co-processor, A fourth output line 65 is connected to an interrupt terminal of the co-processor to supply a tone-sensing signal to the co-processor. First and second transmitting lines 75 and 85 are connected between a subscriber line interfacing circuit and a telephone. The data port of a combocodec 10 is connected to first I/O line 5. A transmitting terminal TXD of combocodec 10 is connected to a receiving terminal RX of the subscriber line interfacing circuit (hereinafter referred simply to as "SLIC") 20. The receiving terminal RXD of combocodec 10 is connected to transmitting terminal TX of SLIC 20. The input of a tone decoder 30 is also connected to the transmitting terminal TX of SLIC 20. The output of tone decoder 30 is connected to third output line 55. The control terminal of tone decoder 30 is connected to fourth output line 65. The input of a ring generator 40 is connected to third input line 25. The output of ring generator 40 is connected to a fixed contact point SP1 of a relay 60. The input of a DC-voltage converter 50 is connected to the fourth input line 35. The output of De-voltage converter 50 is connected to a telephone driving voltage terminal VB of SLIC 20. A ring signal supply terminal RING FEED of SLIC 20 is connected to a selective contact point SP2 of relay 60. A tip terminal TIP of SLIC 20 is coupled with first transmission line 75. A ring terminal RING of SLIC 20 is connected to second transmission line 85. A relay driving terminal RD of SLIC 20 is connected to a control terminal of relay 60. A hook-status sensing signal output terminal SHD of SLIC 20 is connected to second output line 45, A ring control signal input terminal RC of SLIC 20 is connected to second input line 15.

Now, the operation of the apparatus for interfacing an analog telephone according to the present invention will be described in detail with reference to FIGS. 1 and 2.

Figure 2:
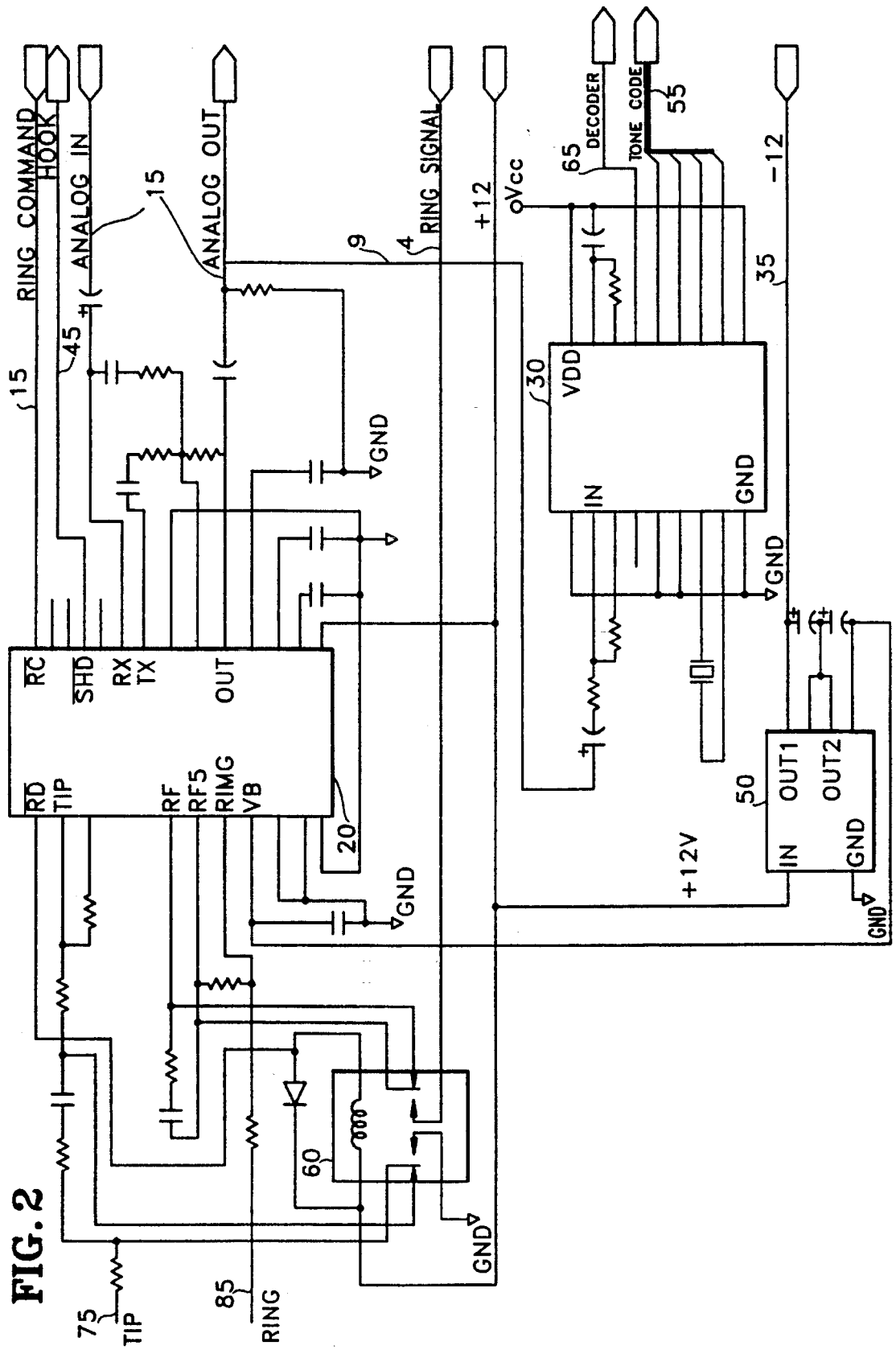

In FIGS. 1 and 2, combocodec 10 converts a digital audio signal passed through first I/O line 5 into an analog audio signal to supply the analog-converted audio signal to receiving terminal RX of SLIC 20 via its transmitting terminal TXD, and also converts an analog audio signal passed from transmitting terminal TX of SLIC 20 to receiving terminal RXD of the combocodec 10, into a digital audio signal and transmits the digitized audio signal to first I/O line 5.

Ring generator 40 receives a ring generating control signal through third input line 25 to generate a ring signal and supply it to fixed contact point SP1 of relay 60.

DC-voltage converter 50 supplies a power supply voltage needed for normal operation of SLIC 20. Here, a AC-voltage required for SLIC 20 ought to be within the range from −42V to −58V to operate the TIP/RING loop. For this operation, first in DC-voltage converter 50, voltages of +15V and −15V result from −12 volts originating from the power source of the personal computer a negative voltage of −42V is generated by combining the supplied 12 volts with the overall potential difference of the newly generated ±15V. This is done to utilize the power from the personal computer without an auxiliary external power source. Then, DC-voltage converter 50 supplies the generated negative voltage of −42V to telephone driving power input terminal VB of SLIC 20.

Relay 60 transmits the ring signal generated from ring generator 40 to the telephone via first and second transmission lines 75 and 85. This operational process is presented below.

If a ring supply control signal is supplied to a ring control signal input terminal RC of SLIC 20 through second input line 15, when relay 60 receives the low logic ring driving signal from a ring driving terminal RD of SLIC 20 through its control terminal, contact points SP1 and SP2 of relay 60 are connected to each other. This enables the ring signal from ring generator 40 to be supplied to ring signal supply terminal RING FEED of SLIC 20. Thus, the ring signal is transmitted along first and second transmission lines 75 and 85 through the TIP and RING terminals of SLIC 20. On the contrary, when the ring driving signal from ring driving terminal RD of SLIC 20 is a high logic, since the contact points SP1 and SP2 of relay 60 are not connected to each other, the ring signal from ring generator 40 does not transmit to first and second transmission lines 75 and 85. SLIC 20 is a subscriber line driving circuit conventionally used in a digital switching board, whose main functions are such as TIP/RING driving, two-wire to four-wire signal switching, hook status detecting, and ring signal processing. The TIP and RING terminals of SLIC 20 are connected to the telephone via first and second transmission lines 75 and 85. When the subscriber performs call set-up, SLIC 20 receives the ring supply control signal entered through second input line 15 to its ring control signal input terminal RC, and operates relay 60 by outputting a low logic ring driving signal from its ring driving terminal RD, thereby allowing the ring signal from ring generator 40 to be supplied to first and second transmission lines 75 and 85. Also, SLIC 20 monitors the on/off state of the telephone hook by the variation in the current or voltage flowing through a loop defined by its TIP terminal, first transmission line 75, the telephone, second transmission line 85, and its RING terminal. A high logic hook-state sensing signal to the coprocessor via hook-state sensing signal output terminal SHD and hook control output line 45 when the telephone is in the hook-on state. When the telephone is hook-off, SLIC 20 supplies a low logic hook-state sensing signal. Also, while a subscriber performs call setup, i.e., during the transmission of the ring signal to the telephone, SLIC 20 senses the answering of the telephone, and then changes the logic state of the ring driving signal to "high", thereby opening the contact points SP1 and SP2 of relay 60 to stop the ring signal transmission. In normal operation, SLIC 20 transmits the audio signal entered at its receiving terminal RX from transmitting terminal TXD of combocodec 10, to the telephone through tip and ring terminals TIP and RING, and then supplies the audio signal entered from the telephone through tip and ring terminals TIP and RING to both receiving terminal RXD of combocodec 10 and tone decoder 30 through its transmitting terminal TX.

Tone decoder 30 transmits a tone sensing signal to the interrupt terminal of the co-processor (not shown) through the fourth output line 65 when a dual tone multi-frequency signal is detected among the audio signals from transmitting terminal TX of SLIC 20, while decoding the dual tone multi-frequency signal to transmit the telephone number-tone data to the control bus of the co-processor (not shown) through third output line 55.

What is claimed is:

1. An apparatus for interfacing an analog telephone in an ISDN terminal adapter provided with a coprocessor for controlling and processing of the communication with network termination equipment, said apparatus comprising:

a combocodec which converts digital audio signals generated from said co-processor into analog audio signals to supply the converted analog audio signals to the telephone, and which converts analog audio signals from the telephone into digital audio signals to supply the digitized audio signals to a coprocessor;

a ring generator which generates a ring signal in response to a ring generating control signal transmitted by the co-processor;

a DC-voltage converter which receives power from a computer power supply, and performs a DC-voltage conversion to supply a voltage required for a TIP/RING loop operation;

a subscriber line interfacing circuit connected to said DC-voltage converter, said combocodec, and the telephone, which supplies a telephone driving voltage generated from said DC-voltage converter to the telephone, transmits a bilateral audio signal between the telephone and said combocodec, and which monitors current or voltage on the TIP/RING loop to distinguish the hook status of the telephone, said subscriber line interfacing circuit including ring and tip terminals, a ring feed terminal, a control signal input terminal and a ring driving terminal;

means for supplying a ring supply control signal to said subscriber line interfacing circuit, said subscriber lines interfacing circuit generating a ring driving signal responsive to the ring supply control signal;

a relay connected to the ring driving terminal of said subscriber line interfacing circuit, said ring generator, and the ring feed of said subscriber line interfacing circuit, which transmits the ring signal generated from said ring generator to said subscriber line interfacing circuit responsive to the ring driving signal; and a tone decoder which decodes a dual tone multi-frequency signal from among said audio signals transmitted from said subscriber line interfacing circuit to said comb-ocodec, which transmits said decoded signal to said co-processor and whereby call set-up is performed independent of simultaneous operation of a computer.

2. An apparatus for interfacing an analog telephone in an ISDN terminal adapter as claimed in claim 1, wherein the logic state of the ring driving signal varies in accordance with the ring supply control signal, and the ring driving signal controls a selective contact point of said relay thereby supplying the ring signal generated from said ring generator to the telephone through the ring and tip terminals of said subscriber line interfacing circuit.

3. An apparatus for interfacing an analog telephone in an ISDN terminal adapter as claimed in claim 1, wherein the subscriber line interfacing circuit changes said ring driving signal to a high logic signal upon sensing the hook-off state of a telephone while carrying out call set-up, thereby cutting off ring signal transmission.

4. An apparatus for interfacing an analog telephone in an ISDN terminal adapter as claimed in claim 2, wherein said subscriber line interfacing circuit changes the ring driving signal to a high logic signal upon sensing a hook-off state of the telephone, thereby cutting off ring signal transmission.

* * * * *

UNITED STATES PATENT AND TRADEMARK OFFICE
CERTIFICATE OF CORRECTION

PATENT NO. : 5,459,788
DATED : October 17, 1995
INVENTOR(S) : Ho-jun Kim

It is certified that error appears in the above-indentified patent and that said Letters Patent is hereby corrected as shown below:

Column 4, Line 36, change "coprocessor" to --co-processor--;

Line 44, change "coprocessor" to --co-processor--.

Column 5, Line 3, between "feed" and "of" insert --terminal--;

Line 11, after and insert --which transmits a tone sensing signal to said co-processor;--.

Signed and Sealed this

Fourth Day of June, 1996

Attest:

BRUCE LEHMAN

Attesting Officer     Commissioner of Patents and Trademarks